(No Model.) 3 Sheets—Sheet 1.
W. S. JOHNSON.
APPARATUS FOR CHARGING AND DISCHARGING SECONDARY BATTERIES.
No. 420,906. Patented Feb. 4, 1890.
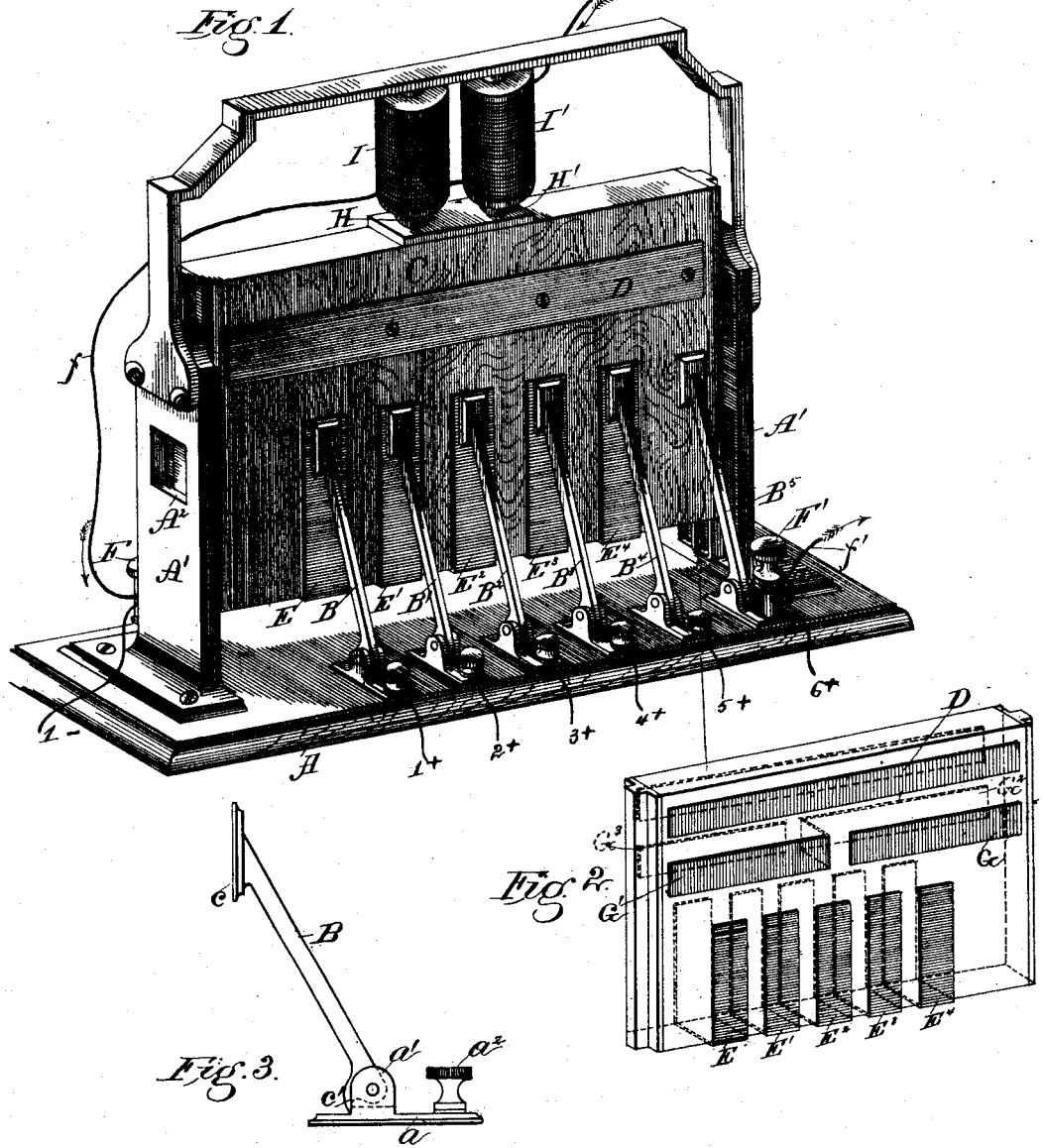
Witnesses:
Inventor:
Warren S. Johnson
By
Stout + Underwood.
Attorneys.

(No Model.) 3 Sheets—Sheet 2.
W. S. JOHNSON.
APPARATUS FOR CHARGING AND DISCHARGING SECONDARY BATTERIES.
No. 420,906. Patented Feb. 4, 1890.
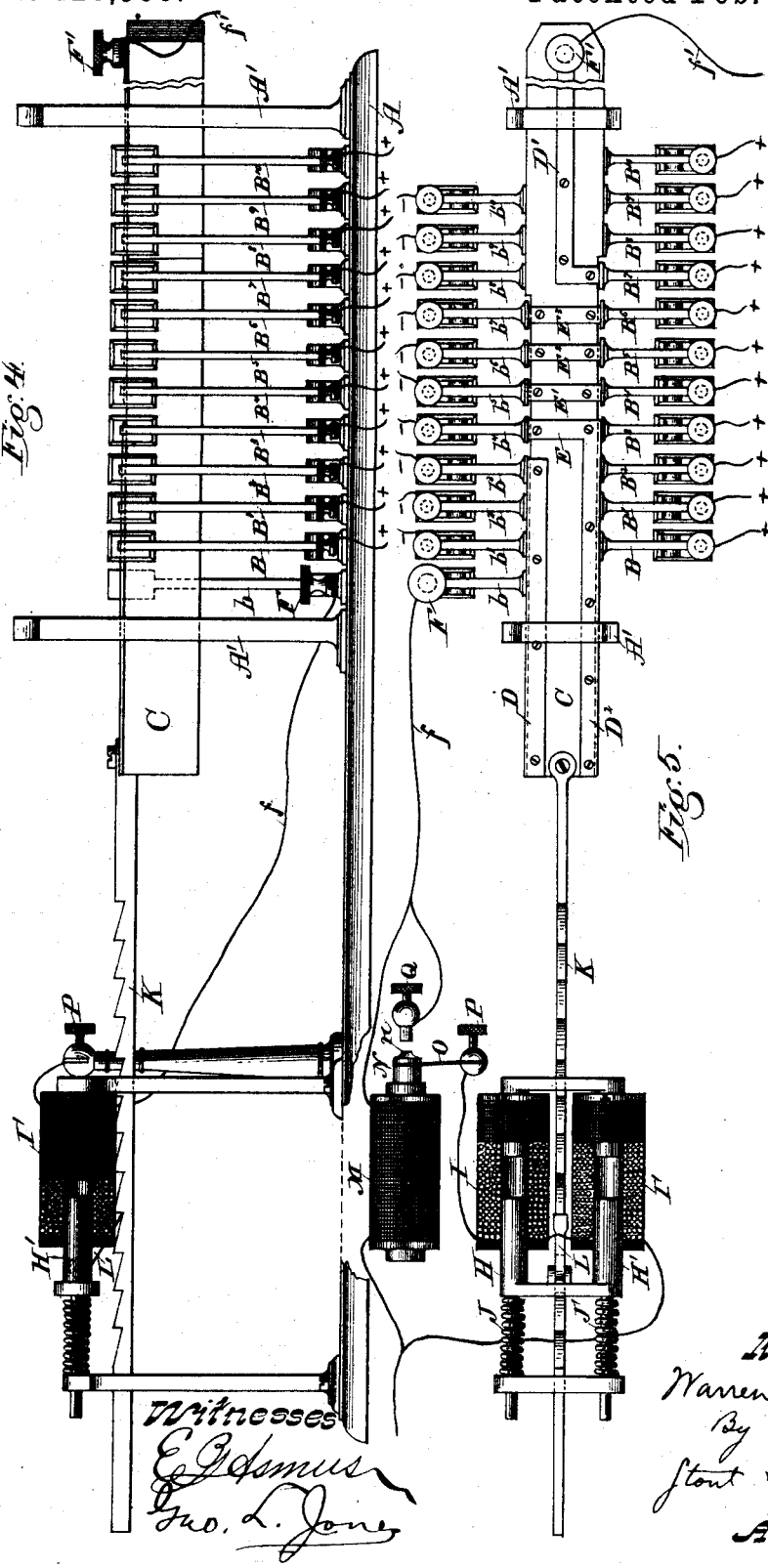

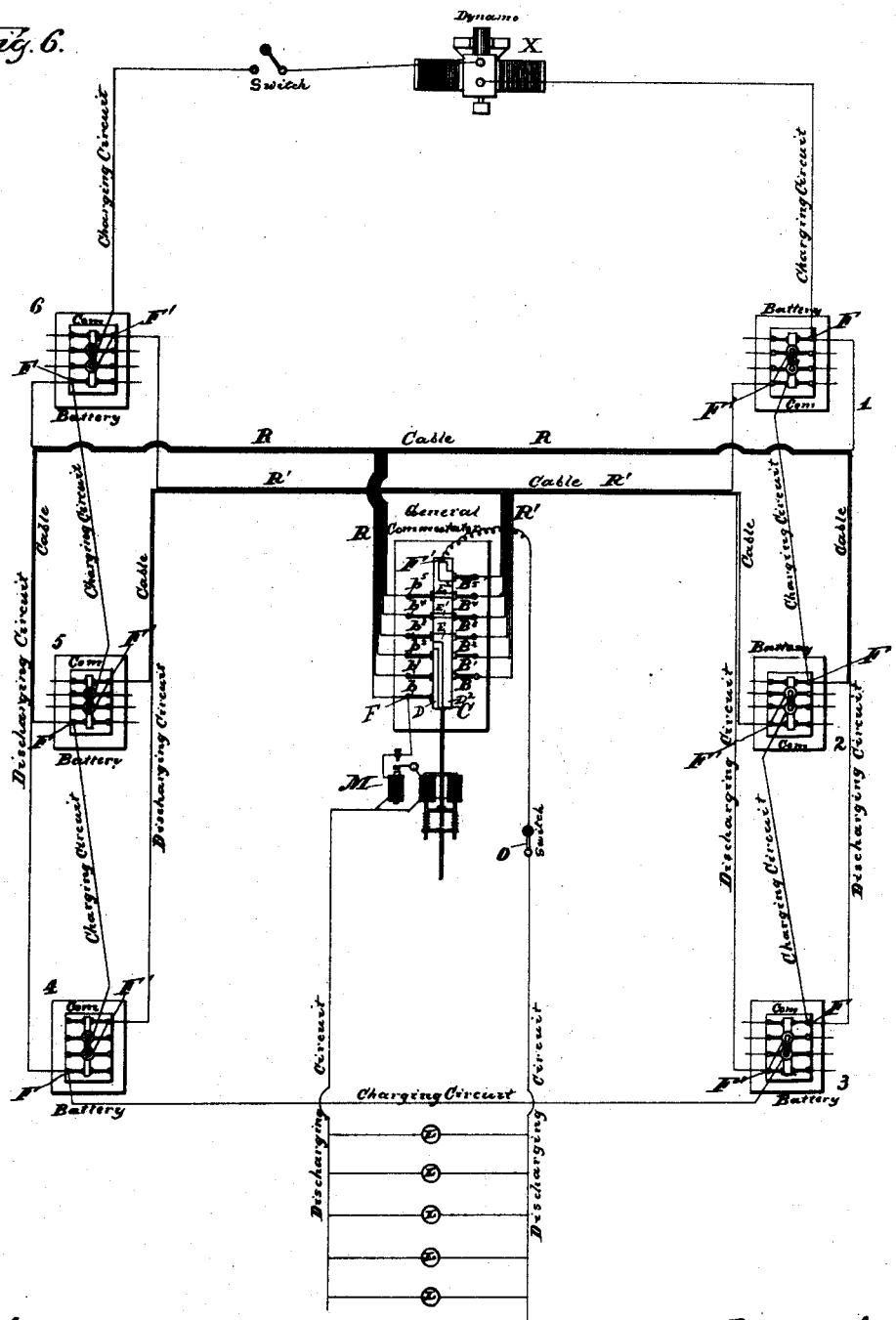

UNITED STATES PATENT OFFICE.

WARREN S. JOHNSON, OF WHITEWATER, ASSIGNOR OF ONE-HALF TO WILLIAM PLANKINTON, OF MILWAUKEE, WISCONSIN.

APPARATUS FOR CHARGING AND DISCHARGING SECONDARY BATTERIES.

SPECIFICATION forming part of Letters Patent No. 420,906, dated February 4, 1890.

Application filed February 2, 1885. Serial No. 90,421. (No model.)

*To all whom it may concern:*

Be it known that I, WARREN S. JOHNSON, of Whitewater, in the county of Walworth, and in the State of Wisconsin, have invented certain new and useful Improvements in a System of Commutators for Secondary Batteries, &c.; and I do hereby declare that the following is a full, clear, and exact description thereof.

My invention relates to that class of mechanical contrivances called "commutators," which are designed to control the passage of an electric current in its direction, electromotive force, &c.; and it consists in certain peculiarities of construction and arrangement, as will be more fully set forth hereinafter.

In the drawings, Figure 1 is a perspective view of one of the division-commutators of my system. Fig. 2 is a view of a slide removed from a commutator. Fig. 3 is a detail of one of the contact-levers which form the poles or terminals of the generators or batteries. Fig. 4 is a side elevation, and Fig. 5 is a plan view, both partially in section, of the general commutator of my system; and Fig. 6 is a diagram representing my system as a whole.

All dynamo and magneto electric machines have commutators, and electric batteries, both primary and secondary, can be conveniently managed only by their use.

The application of my invention has especial reference to secondary batteries, though I do not limit its use to these alone, as in many instances it is equally applicable to other forms of electric generators.

A A' represent the main frames of the commutators of my system, and these frames should be made of some suitable non-conducting substance, as wood, or if of metal or other conducting material the same shou'd be insulated from the electrical conductors of the apparatus.

B B' B², &c., represent the positive poles or terminals of the generators or batteries, all of those on one side being positive and those on the other side (not shown in Fig. 1) being negative, and designated $b$ $b'$ $b^2$, &c. In the division-commutators these poles B B' $b$ $b'$, &c., represent the terminals of cells, while in the general commutator these letters indicate the terminals of batteries to which the division-commutators are applied. In Fig. 3 I show a convenient form of said poles, the same being gravity-levers with contact-plates $c$ at their upper ends and with their lower ends pivoted between ears $a'$ on plates $a$, fastened to the base A of my main frame, the said plates having binding-screws $a^2$, by which the positive (or negative) wires from the cells or battery are secured thereto, the said levers being further provided with stops $c'$ at their lower ends to prevent the levers from dropping too far forward when the slide to be hereinafter described is removed from contact therewith. In place of these contact-levers metallic springs may be employed as the described poles or terminals, especially with a vertically-moving slide, such as is shown in Fig. 1; but I prefer to use the contact-levers, more particularly with a horizontally-moving slide, such as is employed in the general commutator.

C represents the slide, which carries the contact-strips or conducting-pieces, which serve to connect the positive poles with their corresponding negative poles, so as to arrange the generators or batteries either in series or in multiple arc, or in a combination of both, as the case may require.

In Fig. 1 I show, as stated, a vertically-moving slide C, whose ends are fitted with tongues, so as to be guided in grooves in the inner sides of the end pieces A' A' of the main frame. The upper part of this slide bears on each side a continuous metal strip D, extending from end to end, but insulated from each other, which strips, when lowered by the dropping of the slide C, so that the terminals B B', &c., and $b$ $b'$, &c., are in contact with them, serve to connect the cells in multiple arc.

Below the strips D D, and at right angles thereto, are other metallic strips E E' E², &c., which, for convenience in manufacture, pass under the slide C and up a corresponding distance upon the other side, being rigidly fastened to the slide. These strips are so arranged in relation to the terminals or poles that the first strip E serves to connect the positive terminal B of the first generator or cell with the negative terminal $b'$ of the second generator or cell, while the second strip E' serves to connect the positive terminal B' of the second generator with the negative terminal $b^2$ of the third generator, and so on throughout the series of terminals, and hence when, as in Fig. 1, six pairs of terminals are used, connecting by wires 1 to 6 with six generators or cells, there are required five of the strips E E', &c.

F is a binding-post connected to the plate of the first negative pole or terminal $b$ of the first generator and having not only the negative wire 1 of said generator, but also the negative wire $f$, leading from the main circuit, connected thereto. This negative terminal $b$ is not in contact with the first strip E, but the current from the wire $f$ passes through the post F, then through the negative wire 1 to and through the first generator, (not shown,) and then through the positive wire 1 to the plate of the first positive terminal B, and thence through the strip E to the negative terminal $b'$ of the second generator, and then through its negative wire 2 to and through the said second generator and its positive wire 2 to the plate of the positive terminal B' of said second generator, and then through strip E' to the negative terminal $b^2$ of the third generator, and so on through the commutator to the binding-post F', connected to the plate of the last positive terminal $B^5$, which post has connected to it, besides the positive wire 6 of the last generator, the positive wire $f'$ of the main circuit, thus connecting all the generators or cells in series. In said Fig. 1 the slide C hides from view the negative terminals $b$ to $b^5$ and all of the negative-generator wires, except wire 1; but the relative position of these negative terminals with respect to the positive terminals is the same as that shown in Fig. 5, and I have not deemed it necessary to show the generators, cells, or batteries at all.

In Fig. 2 I show a vertical slide detached from the commutator-frame and provided, like the slide shown in Fig. 1, with the continuous multiple-arc strips D and the series strips E to $E^4$, but which has in addition thereto strips for connecting the generators in combination of multiple arc and series. These strips may be arranged in a variety of ways, according to the particular combination desired. In the illustration given I have shown on the positive side first the strip G insulated from the other strips and adapted to connect three cells in multiple arc through the positive terminals $B^3$ $B^4$ $B^5$, and on the negative side a similarly-insulated strip $G^3$ for the negative terminals of the same battery. I also show the strip G, which passes through the slide and continues as the strip $G^2$ on the negative side, and thus serves to connect in series the first three generators, through their positive terminals B B' $B^2$, with the second three generators through their negative terminals $b^3$ $b^4$ $b^5$, the first three generators being in multiple arc in relation to each other, as are the second three generators in relation to each other, while the two sets of three generators each are in series, as stated. It will be seen by this that by the use of the same or different slides having different arrangements of strips the generators may be connected in every conceivable manner so as to get the electro-motive force required.

Returning to Fig. 1, I and I' represent solenoids fixed to the frame A and into which pass the armature-cores H and H'. The solenoids shown in Fig. 1 are in the circuit $f$ $f'$, the charging-circuit of a secondary battery of which B B', &c., $b$ $b'$, &c., are terminals. The soft-iron cores are in such relation to the slide C as to cause it to move when they themselves are moved by the influence of the solenoids. In Fig. 1 a current is supposed to be passing through the circuit $f$ $f'$, of which the secondary batteries form a part. The solenoids have attracted the cores and drawn the slide C up, as seen, so that the various cells are connected in series. When the circuit is broken, the slide C will fall, aided by means of springs or by gravity, or both, until the terminals B B', &c., $b$ $b'$ &c., are in contact with the strips D D, and the cells are therefore in multiple arc. In place of the strips D in multiple arc or the strips E E', &c., in series, there may be substituted such connections as shall give any desired electro-motive force, such as the strips G G', &c., already described. The use of this device is obvious. Let it be supposed that it is desired to charge the secondary batteries, of which B B', &c., are positive poles, with a current of high electro-motive force, such as is used with arc lighting, and to discharge from the batteries a current of low electro-motive force, such as is required for incandescent lighting. When the connections are made with the charging-machine, the batteries offer but small resistance, being coupled in low tension. The charging-machine has therefore no difficulty in passing a current. The current once started, the slide automatically connects up the battery in a tension suitable to the charging-current. Should the current weaken from the slipping or breaking of a belt or from some other cause, the batteries will automatically connect themselves in low tension, thus preventing their discharge through the machine. It is also obvious that when the charging-current is broken the batteries are connected in the proper tension for discharging their current for incandescent lighting without further attention.

Fig. 5 represents the combination of the positive terminals or poles B B', &c., with their corresponding negative ones $b$ $b'$, &c., in the general commutator, and the slide C is here shown as being adapted to move horizontally, together with solenoids and their cores, also horizontally disposed, working through suitable mechanism to move the slide C between the poles B B', &c., and $b$ $b'$, &c., the said poles being the terminals of the division-commutators (shown in Fig. 1) in the operation of my system, all as clearly illustrated in Fig. 6.

In Fig. 1 I have shown square openings $A^2$ in the side pieces $A'$ of the main frame for the reception of a horizontal slide C, such as is shown in Fig. 5, in place of the vertical slide represented in said Fig. 1; or I may use both the commutators, Figs. 1 and 5, together, and then the terminals $b$ and B in Fig. 5 may be connected with the binding-post terminals F and $F'$ of one of the first form of commutators, and the similar binding-post terminals of another like vertical slide-commutator may be connected with the terminals $b'$ and $B'$ of the horizontal slide-commutator, Fig. 5, and so on, in which case the latter commutator will serve to connect several cells or batteries with each pair of its terminals, as shown in Fig. 6, and described more in detail hereinafter.

The commutator shown in Fig. 5 is to be used in discharging secondary batteries when it is necessary that the current shall remain constant within certain limits.

To illustrate the working of the device, it must be explained that the slide C in Fig. 5 has contact-strips upon it, D $D^2$ and E $E'$ $E^2$, &c., which serve the same general purpose as the contact-strips upon the slide C in Fig. 1. Of these strips (shown in Fig. 5) D and $D^2$ serve to connect the poles or terminals in multiple arc, while E $E'$, &c., serve to connect other poles in series; and $D'$ is a strip connecting the last positive pole with the binding-post $F'$ of main circuit, which post is on the slide and moves with it. It will be seen that in the drawings the first four batteries are in multiple arc. Four more are in series in relation to one another and to the first four batteries, while there are three batteries to the right which are not in circuit. Supposing the slide C to remain in the position shown for a certain time while the eight secondary batteries named are discharging, eventually the current will be weakened. Now by moving the slide to the left until the terminals or poles of a new battery rest upon the contact or connecting strip $E^3$ the current will be increased by the addition of the said battery. It is evident that there will be four batteries in series, as before, but five in multiple arc. These, however, are nearly exhausted and act as a single cell, the electro-motive force of the combination remaining as before. By moving the slide at intervals all the batteries will have been brought into the circuit and discharged. This might be done by hand, but to make it automatic I provide the ratchet-bar K, fastened at one end to the slide C. Combined with this bar is the pawl L, fastened to the armature-cores H $H'$ of the solenoids I $I'$.

J $J'$ are springs which tend to remove the cores from the solenoids. Whenever a current passes through the solenoids I $I'$, the armature-cores H $H'$ are drawn in, and as they carry with them the pawl L, and this is in the ratchet of the bar K, the bar is moved forward, thereby pushing the slide C, to which it is fastened, also forward, whereby the last transverse strip $E^3$ will connect with the poles of a new battery. To effect this movement of the slide there is placed in the main circuit the solenoid M, having the armature-core N, to which is fastened the spring O, the other end of which is secured to binding-post P. The armature N bears a contact-point $n$, which forms a contact with binding-post Q when the current through the solenoid M is weakened. The binding-post Q, armature-core N, spring O, binding-post P, and solenoids I $I'$ are in a shunt from the main circuit. When a sufficient current is passing, the armature-core N of the solenoid M is drawn within the solenoid M until the contact between $n$ and Q is broken; but when the current weakens to a certain point the contact is made between $n$ and Q, and a current now passes through the shunt and draws in the armature-cores H $H'$, and thus brings a new battery in circuit. The addition of a new battery strengthens the main current, and the shunt is again broken when the springs J $J'$ withdraw the armature-cores H $H'$, and the pawl L falls into the next notch of the ratchet-bar K. This operation will be repeated so long as there are new batteries to be brought into circuit.

In Fig. 6 I have illustrated my system in its entirety in the preferred arrangement in which the charging-circuit passes around the general commutator. As shown in Fig. 6, the charging-circuit is open and the discharging-circuit closed, the general commutator being in use. The charging-circuit starting from the prime generator X, where it reaches the division-commutator 6, first passes around the solenoid and thence to the post $F'$ and through the battery, emerging at F, and so on to the next division-commutator 5, around its solenoid and to its post $F'$ and through the cells of its battery and emerges at the post F of this commutator, as before, and so on to and through the division-commutators 4, 3, 2, and 1, and thus back to the prime generator. The said division-commutators are located directly over their several batteries, and hence the numerals 1 to 6 will be employed to designate the said batteries, as well as the commutators. The discharging-circuit is completed through the general commutator and the translating devices L L L, &c. As the general commutator now stands, the movable slide C is so set that the first three batteries 1, 2, and 3 are in multiple arc in respect to one another and in series in respect to the succeeding batteries 4, 5, and 6.

To trace the discharging-circuit I will begin at the binding-posts $b$ $b'$ $b^2$ of the general commutator. These three binding-posts are electrically connected through the metallic strip D. From these binding-posts $b$ $b'$ $b^2$ three separate conducting-wires run through the cable R to the binding-posts F F F of the batteries 1, 2, and 3, respectively. The current emerges from the said batteries at the binding-posts F' F' F'. It then passes through three separate conducting-wires run through the cable R' to the binding-posts B B' B² of the general commutator. By means of the strip E it then passes to the binding-post $b^3$, then through the corresponding conductor and cable R to the binding-post F of battery 4. It again emerges at the binding-post F' of battery 4 and passes through the corresponding conductor and cable R' to the binding-post B³ of the general commutator, thence across the strip E' to post $b^4$, thence through battery 5, and in like manner through battery 6 and appears at post F' on the slide C of the general commutator. Passing through the translating devices L L L, &c., of the discharging-circuit and solenoid M of the general commutator it completes the circuit at F of the general commutator.

Having thus described my invention, what I claim as new, and desire to secure by Letters Patent, is—

1. In commutators for secondary batteries, the combination of a slide having upon it two or more series of contact-pieces arranged, substantially as described, so that a change of position of the slide in relation to the terminals or poles of the secondary batteries will commute the current differently, the poles or terminals of a series of secondary batteries, and an electro-magnet or solenoid in circuit, substantially as shown, so that the starting of the current will commute it differently, substantially as set forth.

2. In commutators for secondary batteries, the combination, with the poles or terminals of the same, of a slide having upon it contact pieces or strips arranged substantially as described, whereby a suitable movement of the slide between the poles or terminals of the secondary batteries will serve to keep the current at the same strength within limits, and an electro-magnet or solenoid in shunt-circuit, which electro-magnet or solenoid in shunt-circuit serves to move the said slide between the said terminals, and an electro-magnet or solenoid in main circuit which serves to connect the shunt-circuit when the main circuit weakens to a desired limit, substantially as set forth.

3. In a system of commutators for secondary batteries, the combination of the poles or terminals of the same and a slide having upon it contact pieces or strips arranged substantially as described, whereby a suitable movement of the slide between the poles or terminals of the secondary batteries will serve to keep the current at the same strength within limits, substantially as set forth.

4. In a system of commutators for secondary batteries, the combination of the poles or terminals of the same and a slide having upon it contact pieces or strips arranged substantially as described, whereby a suitable movement of the slide between the poles or terminals of the secondary batteries will serve to keep the current at the same strength within limits, and an electro-magnet or solenoid in circuit mechanically connected through cores, substantially as shown, so that a weakening of the current derived from the secondary batteries shall cause or allow the movement of the slide, so as to place new cells in circuit for the purpose of sustaining the current within limits, substantially as set forth.

5. In a system of commutators for secondary batteries, the combination, with the prime generator, the charging and discharging circuits, the secondary batteries, and the poles or terminals of said batteries, of an intermediate slide moving in the direction of projection of said terminals or poles and having upon it two or more series of contact-plates, whereby a movement of the slide between the terminals or poles shall serve to bring different series of contact-plates between the said terminals or poles, so that the current may be commuted differently, and an electro-magnet or solenoid in circuit, substantially as described, so that when the current through the charging-circuit is started the slide will connect the battery in tension corresponding to the charging-current, and when the current in the charging-circuit stops the slide will connect the battery in tension suited to the required discharging-current, substantially as set forth.

6. In a system of commutators for secondary batteries, the combination, with the prime generator, the charging and discharging circuits, the secondary batteries, and the poles or terminals of the same, of an intermediate slide having upon it contact-plates which serve to connect the terminals of the batteries, said contact-plates being arranged substantially as shown and described, whereby on the addition of a new battery by the movement of the slide the said new battery will be connected in series with those previously in use, while the same movement of the slide will connect the batteries longest in use in multiple arc in relation to the whole circuit, whereby the strength and tension of the current may be kept constant within certain limits, substantially as set forth.

7. In a system of commutators for secondary batteries, the combination, with the prime generator, the charging and discharging circuits, the secondary batteries, and the poles or terminals of the same, of an intermediate slide having upon it contact-plates which serve to connect the terminals of the batteries, said contact-plates being arranged substantially as shown and described, whereby on the addition of a new battery by the movement of the slide the said new battery will be connected in series with those previously in use, while the same movement of the slide will connect the batteries longest in use in multiple arc in relation to the whole circuit, whereby the strength and tension of the current may be kept constant within certain limits, and an electro-magnet or solenoid in circuit mechanically connected with the slide through their armatures or cores, so that a weakening of the current will cause or allow the slide to move between the terminals, so that the current may be kept constant within limits, substantially as set forth.

8. In a system of commutators for secondary batteries, the combination of a prime generator, charging and discharging circuits, secondary batteries, and two or more division-commutators having an intermediate slide between the terminals or poles of the cells in the division to which each commutator is attached, said slide having upon it two or more series of contact-plates, whereby by a movement of the slide the current may be commuted differently, and a general commutator having a slide movable between the poles or terminals leading from the division-commutators, said slide having contact-plates so arranged that by a proper movement of the same the strength of the current may be kept within certain limits, substantially as set forth.

9. In a system of commutators for secondary batteries, the combination of the prime generator, charging and discharging circuits, secondary batteries, and the terminals or poles of said batteries, a slide movable between said poles and bearing suitable contact-plates, said contact-plates arranged to connect new batteries in series and those longest in use in multiple arc, an electro-magnet or solenoid in a shunt-circuit, said electro-magnet or solenoid serving to move said slide when necessary, and an electro-magnet or solenoid in the main circuit which upon the weakening of the main current will close the said shunt-circuit, substantially as set forth.

In testimony that I claim the foregoing I have hereunto set my hand on this 27th day of March, 1883, in the presence of two witnesses.

WARREN S. JOHNSON.

Witnesses:
H. G. UNDERWOOD,
S. S. STOUT.